United States Patent [19]
Humbarger et al.

[11] Patent Number: 5,746,690
[45] Date of Patent: May 5, 1998

[54] METHOD AND APPARATUS FOR FOLDING AN INFLATABLE CUSHION

[75] Inventors: Robert Allen Humbarger, Fairborn; Paul V. Camposeo, Huber Heights; Terry William Hurtig, Dayton, all of Ohio

[73] Assignee: Omega Automation, Inc., Dayton, Ohio

[21] Appl. No.: 671,649

[22] Filed: Jun. 28, 1996

[51] Int. Cl.$^6$ ................................................ B60R 21/16
[52] U.S. Cl. ........................... 493/405; 493/451; 493/940; 53/117; 53/120; 53/429
[58] Field of Search ............................ 493/243, 244, 493/256, 266, 267, 314, 405, 406, 450, 451, 457, 458, 940; 53/429, 116, 117, 120; 280/728.1, 743.1

[56] References Cited

U.S. PATENT DOCUMENTS

| | | |
|---|---|---|
| 3,839,947 | 10/1974 | Kornas et al. |
| 3,839,948 | 10/1974 | Putti et al. |
| 5,009,740 | 4/1991 | Yanai ................................ 493/194 |
| 5,066,269 | 11/1991 | Center et al. ...................... 493/183 |
| 5,162,035 | 11/1992 | Baker . |
| 5,163,893 | 11/1992 | Hara et al. |
| 5,177,930 | 1/1993 | Harston et al. ..................... 493/167 |
| 5,205,807 | 4/1993 | Adams, Jr. et al. ................ 493/175 |
| 5,275,435 | 1/1994 | Fischer .............................. 280/728.1 |
| 5,300,011 | 4/1994 | Budde et al. |
| 5,360,387 | 11/1994 | Baker . |
| 5,375,393 | 12/1994 | Baker et al. |
| 5,391,137 | 2/1995 | DePoy et al. |
| 5,456,651 | 10/1995 | Baker et al. |
| 5,471,817 | 12/1995 | Baker et al. |
| 5,492,367 | 2/1996 | Albright et al. ................... 280/743.1 |
| 5,493,846 | 2/1996 | Baker et al. |

Primary Examiner—Joseph J. Hail, III
Assistant Examiner—Darren Ark
Attorney, Agent, or Firm—Killworth, Gottman, Hagan & Schaeff, L.L.P.

[57] ABSTRACT

An automated inflatable cushion folding process is provided wherein cushion tension, and, as a consequence, cushion wear, is reduced during the folding process. An inflatable cushion portion of a cushion assembly is folded by installing a cushion assembly in a cushion fixture and a cushion receiving mechanism such that an inflatable cushion portion of the cushion assembly is positioned along a cushion path extending between the cushion fixture and the cushion receiving mechanism and creating at least one fold in the inflatable cushion portion at a fold location along the cushion path by actuating a fold developer and moving the cushion fixture incrementally towards the fold location.

16 Claims, 6 Drawing Sheets

METHOD AND APPARATUS FOR FOLDING AN INFLATABLE CUSHION

BACKGROUND OF THE INVENTION

The present invention relates to an inflatable cushion folding device. Specifically, the present invention relates to a method and apparatus for folding an inflatable cushion wherein cushion tension, and, as a consequence, cushion wear, is reduced during the folding process.

Inflatable cushions, or airbags, are widely used in automobiles for supplemental driver and passenger restraint during vehicle impact. Inflatable cushions are commonly mounted in vehicle steering wheels, steering columns, and dashboards, and consequently, must be folded to fit within these areas of the vehicle. The airbags must also be capable of unfolding and inflating rapidly without binding. A particular airbag may be refolded only a limited number of times—partly because a certain degree of wear is imparted to the inflatable cushion each time the bag is folded.

Currently, there are a variety of automated airbag folding devices used to fold an inflatable cushion into a desired configuration or pattern. Airbags are particularly susceptible to wear during folding with an automated folding device because it is difficult to control cushion tension throughout the folding process. Accordingly, there is a need for an automated airbag folding device which reduces airbag tension and wear during the folding process.

SUMMARY OF THE INVENTION

This need is met by the present invention wherein a method and apparatus for folding an inflatable cushion are provided. According to the present invention, an automated inflatable cushion folding process is presented wherein cushion tension, and, as a consequence, cushion wear, is reduced during the folding process.

In accordance with one embodiment of the present invention, a method of folding an inflatable cushion portion of a cushion assembly is provided comprising the steps of: installing a cushion assembly in a cushion fixture and a cushion receiving mechanism such that an inflatable cushion portion of the cushion assembly is positioned along a cushion path extending between the cushion fixture and the cushion receiving mechanism; and creating at least one fold in the inflatable cushion portion at a fold location along the cushion path by actuating a fold developer and moving the cushion fixture incrementally towards the fold location.

The method may further comprise the step of causing the cushion receiving mechanism to disengage the inflatable cushion prior to actuation of the fold developer. The installing step may comprise inserting a free end of the inflatable cushion portion between a pair of rollup blades and advancing the pair of rollup blades in a direction transverse to the cushion path so as to engage the inflatable cushion portion between the pair of rollup blades. The fold developer is preferably actuated subsequent to an initial incremental movement of the cushion fixture. The fold developer is preferably actuated a second time following a second incremental movement of the cushion fixture.

Further, the fold developer may be actuated and the cushion fixture moved in an alternating sequence.

In accordance with another embodiment of the present invention, a folding device for folding an inflatable cushion portion of a cushion assembly is provided comprising: a cushion fixture adapted to releasably engage a cushion module of a cushion assembly; a cushion receiving mechanism spaced from the cushion fixture and adapted to releasably engage an inflatable cushion portion of the cushion assembly such that the cushion portion is positioned along a cushion path extending between the cushion fixture and the cushion receiving mechanism; a fold developer positioned in a folding area located along the cushion path for creating at least one fold in the inflatable cushion portion; a fixture servo assembly coupled to the cushion fixture for effecting incremental movement of the cushion fixture towards the fold developer; and a fold controller operative to actuate the fold developer and operative to command the fixture servo assembly to move the cushion fixture incrementally towards the fold developer.

The fold controller is preferably further operative to cause the cushion receiving mechanism to disengage the inflatable cushion prior to actuation of the fold developer. The fold controller may be operative to actuate the fold developer subsequent to an initial incremental movement of the cushion fixture.

The fold developer preferably includes a plurality of fold blades, wherein the fold controller is operative to actuate a first fold blade subsequent to a first incremental movement of the cushion fixture and actuate a successive fold blade following a subsequent second incremental movement of the cushion fixture. The fold controller may be operative to actuate the fold developer and command the fixture servo assembly in an alternating sequence. The cushion receiving mechanism may comprise a cushion receiving mechanism transverse actuator and a cushion receiving mechanism rotary drive. The cushion receiving mechanism may alternatively comprise a pair of rollup blades defining a cushion portion receiving space therebetween; a cushion receiving mechanism transverse actuator operative to advance the pair of rollup blades along a path transverse to the cushion path; a bushing positioned at an end point of the transverse path and having a blade contacting surface which upon being contacted by distal ends of the pair of rollup blades causes the rollup blades to move toward one another to clamp the cushion portion therebetween. Distal ends of each of the pair of rollup blades, a rolling blade contacting surface of the bushing, or both the distal ends and the rolling blade contacting surface preferably include a tapered surface.

In accordance with yet another embodiment of the present invention, a method of folding an inflatable cushion portion of a cushion assembly is provided comprising the steps of: installing a cushion assembly in a cushion fixture and a cushion receiving mechanism such that an inflatable cushion portion of the cushion assembly is positioned along a cushion path extending between the cushion fixture and the cushion receiving mechanism; and creating at least one fold in the inflatable cushion portion at a fold location along the cushion path by moving a distal end of a folding blade along a distal end path, the distal end path including (i) a cushion approaching component of movement and (ii) a gathering component of movement parallel to the cushion path and directed towards the cushion receiving mechanism.

The distal end path may further includes a cushion fixture approaching component of movement parallel to the cushion path and directed towards the cushion fixture and wherein the distal end path extends towards the cushion fixture prior to extending towards the cushion receiving mechanism. The step of creating the at least one fold may include the step of changing the orientation of an axis of the folding blade from a first position perpendicular to the cushion path to a second position not perpendicular to the cushion path to a third position perpendicular to the cushion path. The step of creating at least one fold may further comprise creating a plurality of additional folds in the inflatable cushion at the fold location by moving a distal end of successive ones of a plurality of folding blades towards the cushion path along respective distal end paths substantially parallel to the distal end path. The step of creating at least one fold may comprise creating the at least one fold by moving a distal end of a lower folding blade along a lower blade distal end path including (i) a cushion approaching component of movement and (ii) a gathering component of movement parallel to the cushion path and directed towards the cushion receiving mechanism and subsequently moving a distal end of an upper folding blade towards the cushion path along an upper blade distal end path including (i) a cushion approaching component of movement and (ii) a gathering component of movement parallel to the cushion path and directed towards the cushion receiving mechanism.

The method may further comprise the step of creating a plurality of additional folds in the inflatable cushion at the fold location by moving successive upper folding blades along successive upper blade distal end paths parallel to the upper blade distal end path and successive lower folding blades along successive lower blade distal end paths parallel to the lower blade distal end path.

In accordance with yet another embodiment of the present invention, an inflatable cushion folding device is provided comprising: a cushion fixture adapted to releasably engage a cushion module of a cushion assembly; a cushion receiving mechanism spaced from the cushion fixture and adapted to releasably engage an inflatable cushion portion of the cushion assembly such that the cushion portion is positioned along a cushion path extending between the cushion fixture and the cushion receiving mechanism; a fold developer positioned in a folding area located along the cushion path for creating at least one fold in the inflatable cushion portion, the fold developer including at least one folding blade slidably coupled to a blade track wherein the blade track defines a track path designed to permit movement of a distal end of the at least one folding blade along a distal end path including (i) a cushion approaching component of movement and (ii) a gathering component of movement parallel to the cushion path and directed towards the cushion receiving mechanism.

The distal end path preferably includes a cushion fixture approaching component of movement parallel to the cushion path and directed towards the cushion fixture. The blade track may be designed to permit the orientation of an axis of the folding blade to change from a first position perpendicular to the cushion path to a second position not perpendicular to the cushion path to a third position perpendicular to the cushion path. The fold developer may further comprise a plurality of additional folding blades slidably coupled to respective blade tracks wherein each of the respective blade tracks defines respective track paths designed to permit movement of a distal end of one of the plurality of folding blades towards the cushion path along respective distal end paths substantially parallel to the distal end path.

The fold developer may comprise an upper folding blade slidably coupled to an upper blade track and a lower folding blade slidably coupled to a lower blade track wherein the upper blade track defines an upper track path designed to move a distal end of the upper folding blade along an upper blade distal end path including (i) a cushion approaching component of movement and (ii) a gathering component of movement parallel to the cushion path and directed towards the cushion receiving mechanism and the lower blade track defines a lower track path designed to move a distal end of the lower folding blade along a lower blade distal end path including (i) a cushion approaching component of movement and (ii) a gathering component of movement parallel to the cushion path and directed towards the cushion receiving mechanism. The fold developer may further comprise successive upper folding blades slidably coupled to successive upper blade tracks and successive lower folding blades slidably coupled to successive lower blade tracks wherein the successive upper blade tracks define successive upper track paths designed to move successive distal ends of the successive upper folding blades along successive upper blade distal end paths substantially parallel to the upper blade distal end path and wherein the successive lower blade tracks define successive lower track paths designed to move successive distal ends of the successive lower folding blades along successive lower blade distal end paths substantially parallel to the lower blade distal end path.

In accordance with yet another embodiment of the present invention, a folding device for folding an inflatable cushion portion of a cushion assembly is provided comprising: a cushion fixture operative to releasably engage a cushion module of a cushion assembly; a cushion receiving mechanism spaced from the cushion fixture and operative to releasably engage an inflatable cushion portion of the cushion assembly such that the cushion portion is positioned along a cushion path extending between the cushion fixture and the cushion receiving mechanism; a fold developer positioned in a folding area located along the cushion path and operative to create at least one fold in the inflatable cushion portion; a fixture servo assembly coupled to the cushion fixture operative to effect incremental movement of the cushion fixture towards the fold developer; a fixture rotation assembly coupled to the cushion fixture operative to effect rotary movement of the cushion fixture about a rotary fixture axis perpendicular to the cushion path; a left side stuff blade assembly positioned adjacent the cushion path and operative to reciprocally advance a left side stuff blade in the direction of the cushion path; a right side stuff blade assembly positioned adjacent the cushion path and operative to reciprocally advance a right side stuff blade in the direction of the cushion path; a left side fold assembly positioned proximate the cushion path and operative to reciprocally advance a left side folding flap and a left heat shield flap of the cushion portion from an unfolded position to a folded position; a right side fold assembly positioned proximate the cushion path and operative to reciprocally advance a right side folding flap and a right heat shield flap of the cushion portion from an unfolded position to a folded position; a fold retainer assembly positioned proximate the cushion path and operative to reciprocally advance a fold retainer arm from a fold retainer arm home position to a heat shield engaging position; a fold compressor positioned adjacent the cushion receiving mechanism and operative to reciprocally advance in a direction parallel to the cushion path so as to compress the at least one fold; and a fold controller for controlling the operation of the cushion fixture, the cushion receiving mechanism, the fold developer, the fixture servo assembly, the fixture rotation assembly, the left side stuff blade, the right side stuff blade, the left side fold assembly, the right side fold assembly, the fold retainer assembly, and the fold compressor.

Preferably, the fold controller is operative to: cause the cushion fixture to engage the cushion module; cause the cushion receiving mechanism to engage the inflatable cushion portion; cause the fixture rotation assembly to rotate the cushion fixture to a horizontal position; effect inflation of the cushion portion; cause the left side stuff blade assembly and the right side stuff blade assembly to advance the left side stuff blade and the right side stuff blade in the direction of the cushion path; effect evacuation of the cushion portion; cause the left side stuff blade assembly and the right side stuff blade assembly to retract the left side stuff blade and the right side stuff blade; cause the left side fold assembly to advance the left side folding flap and the left heat shield flap from the unfolded position to the folded position; cause the right side fold assembly to advance the right side folding flap and the right heat shield flap from the unfolded position to the folded position; cause the fold retainer assembly to advance the fold retainer arm from the fold retainer arm home position to the heat shield engaging position; cause the left side fold assembly to advance the left side folding flap from the folded position to the unfolded position; cause the right side fold assembly to advance the right side folding flap from the folded position to the unfolded position; create tension in the cushion portion by causing the cushion receiving mechanism rotary drive to rotate the pair of rollup blades 145 degrees in a first direction; command the fixture servo assembly and the cushion receiving mechanism rotary drive such that the cushion fixture is advanced toward the cushion receiving mechanism until the pair of rollup blades has rotated an additional 665 degrees in the first direction; cause the cushion receiving mechanism to disengage the inflatable cushion portion and cause the cushion receiving mechanism rotary drive to rotate the pair of rollup blades 180 degrees in a second direction opposite the first direction; actuate the fold developer and command the fixture servo assembly to move the cushion fixture incrementally towards the fold developer; cause the fixture rotation assembly to rotate the cushion fixture to a vertical position; activate the cushion receiving mechanism transverse actuator such that the cushion receiving mechanism is removed from the cushion path; cause the fold compressor to advance in the direction of the cushion path so as to compress the at least one fold; and cause the cushion fixture to release the cushion module.

In accordance with yet another embodiment of the present invention, an inflatable cushion folding device is provided comprising: cushion folding hardware operative to create at least one fold in an inflatable cushion portion of an inflatable cushion assembly; a first servomechanism coupled to the cushion folding hardware and operative to effect movement of a first hardware portion of the cushion folding hardware; and a fold controller in communication with the first servomechanism and programmed to control the operation of the first servomechanism to effect variable movement of the first hardware portion.

The device may further comprise a second servomechanism coupled to the cushion folding hardware and operative to effect movement of a second hardware portion of the cushion folding hardware, wherein the fold controller is further programmed to control the operation of the second servomechanism to effect variable movement of the second hardware portion of the cushion folding hardware. The second hardware portion of the cushion folding hardware may comprise a pair of rollup blades adapted to engage the cushion portion and the second servomechanism may comprise a servo rotary drive coupled to the rollup blades. The first hardware portion of the cushion folding hardware may comprise a cushion fixture adapted to releasably engage a cushion module of the cushion assembly and the first servomechanism may comprise a servo motor for effecting incremental movement of the cushion fixture.

The cushion folding hardware may further comprise a fold developer positioned between the cushion fixture and the rollup blades for creating the at least one fold in the inflatable cushion portion. The controller is preferably programmed to control the operation of the fold developer and the servo motor so as to permit the cushion portion to be folded without unacceptable stretch occurring at the cushion portion.

Accordingly, it is an object of the present invention to provide an efficient automated air bag folding process. Other objects, features, and advantages of the present invention will become apparent upon consideration of the detailed description, the accompanying drawings, and the appended claims.

DETAILED DESCRIPTION OF THE INVENTION

Figure 1:
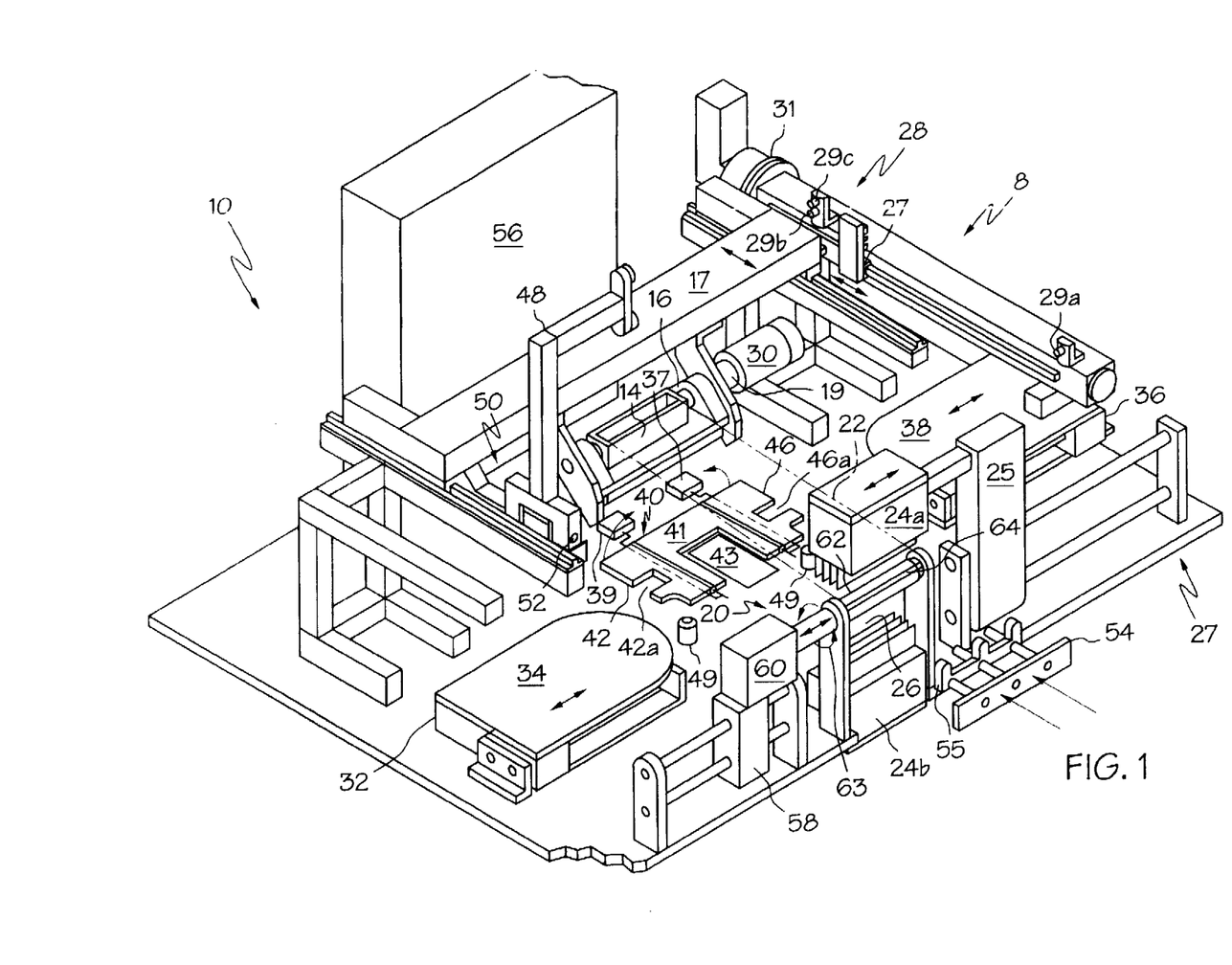
FIG. 1 is a perspective view of an inflatable cushion folding device according to the present invention.
Figures 2A, 2B, 2C, 2D:
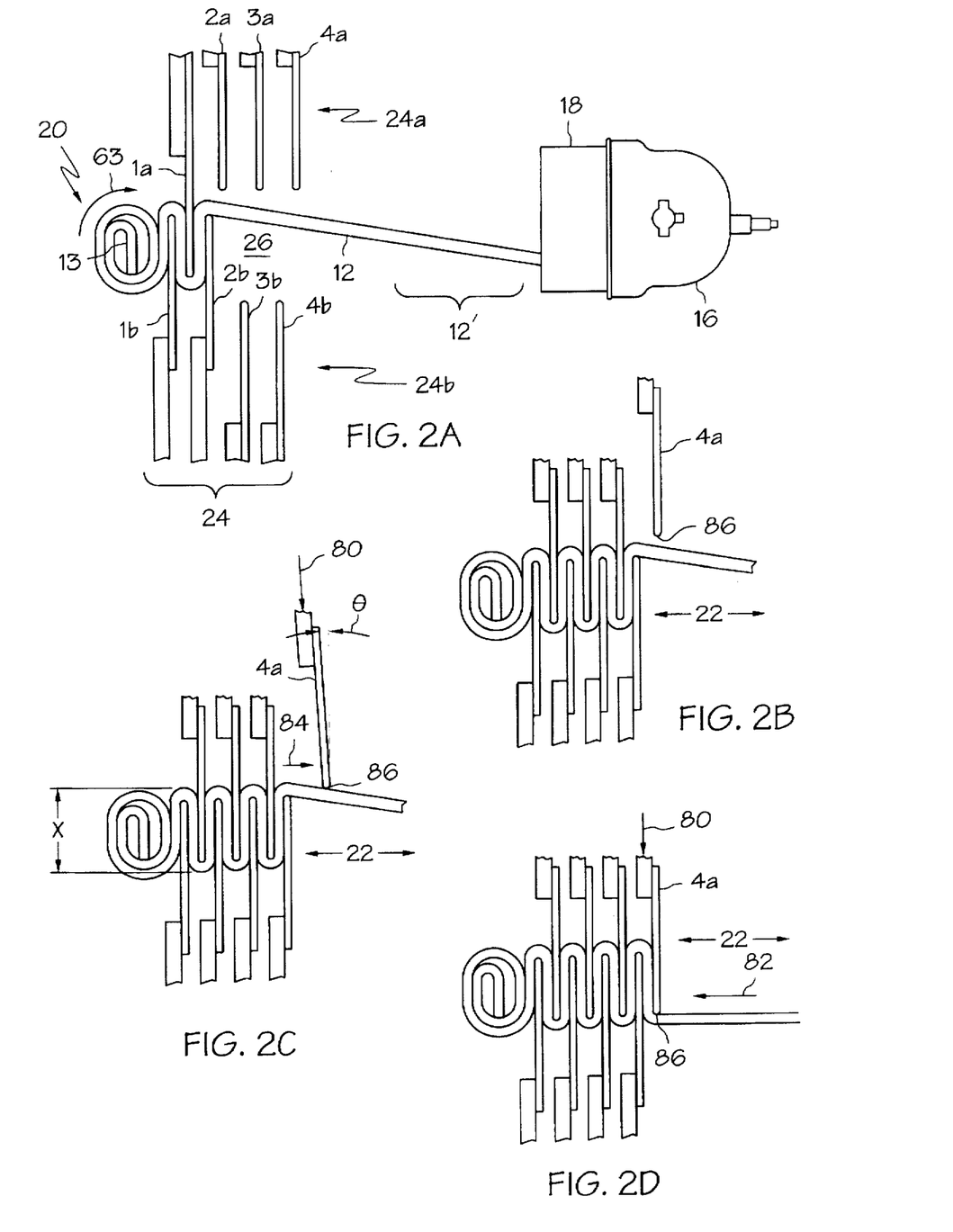
FIGS. 2A–2D illustrate an inflatable cushion folding sequence according to the present invention.

Referring to FIGS. 1 and 2A, a folding device 10 for folding an inflatable cushion portion 12 of a cushion assembly 14 is shown comprising a fold controller 56 and cushion folding hardware 8 operative to create at least one fold in the inflatable cushion portion 12. A cushion fixture 16 is operative to releasably engage a cushion module 18 of the cushion assembly 14. A cushion receiving mechanism 20 is spaced from the cushion fixture 16 and is operative to releasably engage the inflatable cushion portion 12, including a cushion end section 13, of the cushion portion 12 such that the cushion portion 12 is positioned along a cushion path 22 extending between the cushion fixture 16 and the cushion receiving mechanism 20. The cushion receiving mechanism 20 is described in detail below with reference to FIGS. 1, 6 and 7. The cushion fixture 16 comprises a parallel gripper, e.g, a Robohand™ gripper available from Kammerer Sales, Cincinnati, Ohio, coupled to mounting hardware designed to fit the particular dimensions of the cushion module 18.

A fold developer 24 is positioned in a folding area or fold location 26 located along the cushion path 22 and is operative to create at least one fold in the inflatable cushion portion 12 in the manner described below. The fold developer 24 includes, a fold stripper 23 (see FIGS. 4 and 5), an upper folding blade unit 24a, a lower folding blade unit 24b, and an upper folding blade unit shuttle 25, see FIGS. 1 and 4. The upper folding blade unit shuttle 25 is coupled to a pneumatic cylinder drive and together are operative to move the upper folding blade unit 24a back and forth between an extended position proximate the folding area 26 and a retracted position 27 to the far right of the folding area 26, as illustrated in FIG. 1. In the arrangement of FIG. 1, the upper folding blade unit 24a lies in the extended position.

Figure 5:
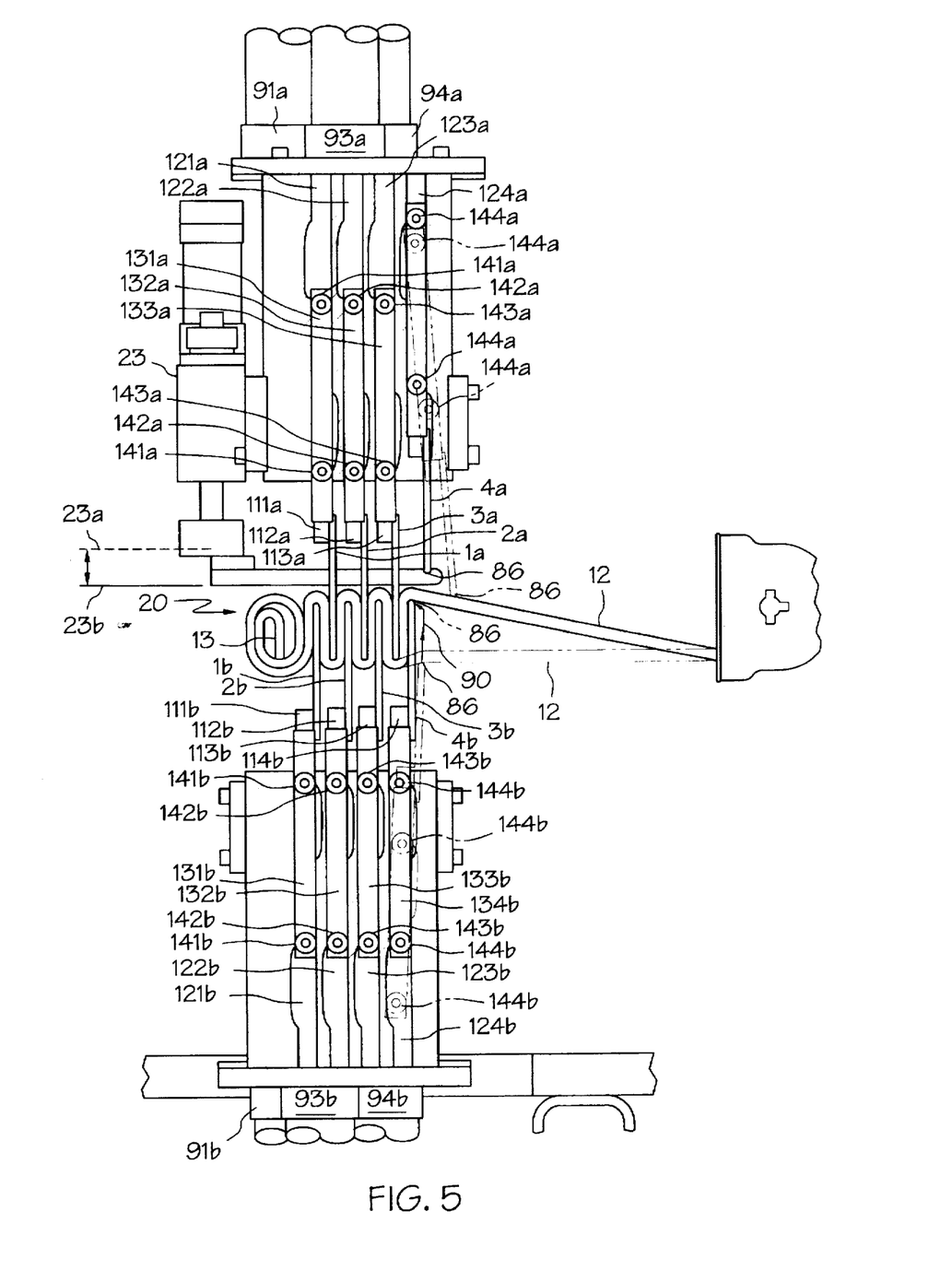
FIG. 5 is a cross sectional view of the fold developing unit taken along line 5—5 in FIG. 3.

The fold stripper 23, illustrated in FIG. 5, is operative to raise and lower between a cushion portion engaging position, designated by solid line 23b, and a raised fold stripper position, designated by broken line 23a, see FIG. 5. In the arrangement of FIG. 5, the fold stripper 23 lies in the engaging position 23b.

A first servomechanism of the folding device 10 comprises a fixture servo assembly 28 including a electronic servo motor, an example of which is commercially available from Emerson Electronic Motion Controls, under the product name Emerson Servo Motor, and a ballscrew linear actuator is mechanically coupled to the cushion fixture 16 via main slide assembly 17 and is operative to effect incremental movement of a first hardware portion of the cushion folding hardware, i.e., variable movement of the cushion fixture 16 along the cushion path 22 towards the fold developer 24. A fixture rotation assembly 30 comprising a pneumatic vane rotary actuator is coupled to the cushion fixture 16 via fixture drive train 19 and is operative to effect rotary movement of the cushion fixture 16 about a rotary fixture axis substantially perpendicular to the cushion path 22.

A left side stuff blade assembly 32 comprising a linear pneumatic slide and a left side stuff blade 34 is positioned adjacent the cushion path 22. The linear pneumatic slide of the left side stuff blade assembly 32 is operative to reciprocally advance the left side stuff blade 34 in the direction of the cushion path 22. Similarly, a right side stuff blade assembly 36 comprising linear pneumatic slide and a right side stuff blade 38 is positioned adjacent the cushion path 22. The linear pneumatic slide of the right side stuff blade assembly 36 is operative to reciprocally advance the right side stuff blade 38 in the direction of the cushion path 22. The right side stuff blade 38 is positioned at a higher vertical elevation than the left side stuff blade 34 to prevent collision of the left and right stuff blades 34, 38 when they are advanced towards each other.

A left side fold assembly 40 comprising a left side folding flap 42 and a folding flap pneumatic rack and pinion style rotary actuator driving assembly 39 is positioned proximate the cushion path 22. The driving assembly 39 of the left side fold assembly 40 is operative to reciprocally advance the left side folding flap 42 and a left heat shield flap (not shown) of the cushion portion 12 from an unfolded position to a folded position. Similarly, a right side fold assembly 44 comprising a right side folding flap 46 and a folding flap pneumatic rack and pinion style rotary actuator driving assembly 37 is positioned proximate the cushion path 22. The driving assembly 37 of right side fold assembly 44 is operative to reciprocally advance the right side folding flap 46 and a right heat shield flap (not shown) of the cushion portion 12 from an unfolded position to a folded position. The left side fold assembly 40 and the right side fold assembly 44 are coupled to a rear support table 41 which is operative to raise and lower the left and right side fold assemblies 40, 44. A pair of bag support members 49 are provided to secure the left and right heat shield flaps with a suction force prior to movement of the folding flaps 42, 46. The heat shield flaps are part of the cushion assembly 14, are attached as a unitary piece to the cushion module 18, and are formed of the same material as the cushion portion 12. The unitary heat shield piece is designed so as to wrap completely around the cushion portion 12 at a cushion portion base 12' when the folding flaps 42, 46 are advanced. The unitary heat shield piece protects the cushion portion 12 from heat originating during deployment.

A fold retainer assembly 50 including a pneumatic vane rotary actuator (not shown) and a fold retainer arm 48 is positioned proximate the cushion path 22. The rotary actuator is operative to reciprocally advance the fold retainer arm 48 from a fold retainer arm home position to a heat shield engaging position. FIG. 1 illustrates the fold retainer arm home position. The fold retainer arm 48 lies in the heat shield engaging position when the arm 48 has rotated approximately 90 degrees in the direction of the cushion path 22 about a fold retainer assembly shaft 52. A front support table 43 provides a surface against which the fold retainer arm 48 urges the folded heat shields and the cushion portion 12 when the retainer arm 48 is in the heat shield engaging position. A pneumatic slide (not shown) is operative to raise and lower the front support table 43 towards and away from the cushion path 22.

A fold compressor 54 comprising an air cylinder drive (not shown) and a push bar 55 is positioned adjacent the cushion receiving mechanism 20. The air cylinder drive is operative to reciprocally advance the push bar 55 in a direction parallel to the cushion path 22 so as to compress the at least one fold. The fold controller 56 controls the operation of the cushion fixture 16, the cushion receiving mechanism 20, the fold developer 24, the upper folding blade unit shuttle 25, the fixture servo assembly 28, the fixture rotation assembly 30, the left side stuff blade assembly 32, the right side stuff blade assembly 36, the left side fold assembly 40, the front and rear support tables 41, 43 and their associated raise/lower drives, the right side fold assembly 44, the fold retainer assembly 48, and the fold compressor 54.

The cushion receiving mechanism 20 includes a cushion receiving mechanism transverse actuator 58 which is coupled to a pneumatic three position cylinder drive (not shown). The three position pneumatic cylinder drive is operative to reciprocally move the transverse actuator 58 towards and away from the cushion path 22 and to stop the movement towards and away from the cushion path 22 at three distinct positions. The cushion receiving mechanism 20 also includes a second servomechanism comprising a cushion receiving mechanism servo rotary drive 60 mechanically coupled to the transverse actuator 58 and comprising an electronic rotary servo motor (not shown), which is commercially available from Emerson Electronic Motion Controls, under the product name Emerson Servo Motor. The second servomechanism is operative to effect movement of a second hardware portion of the cushion folding hardware, i.e. the cushion receiving mechanism 20, by rotating the pair of rolling blades 62 to a variable angular position. It is contemplated by the present invention that the pneumatic three position cylinder drive could be replaced by a multiposition cylinder drive facilitating movement of the transverse actuator 58 to two or more than three positions.

The cushion receiving mechanism servo rotary drive 60 is operative to rotate the pair of rollup blades 62. A home position of the servo rotary drive 60 is signalled by a stationary limit switch triggered by a cam which rotates with the rollup blades 62.

Figure 6:
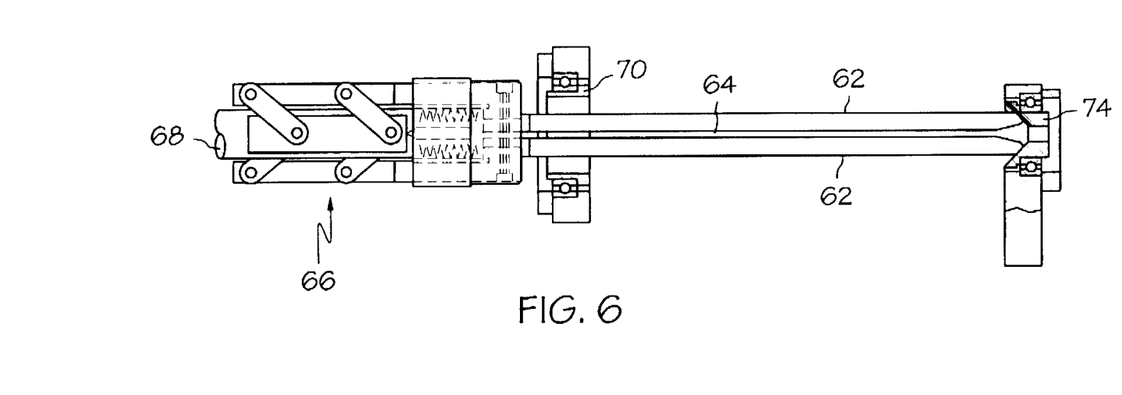
FIG. 6 is an illustration of a rolling blade assembly according to the present invention in a fully engaged position.
Figure 7:
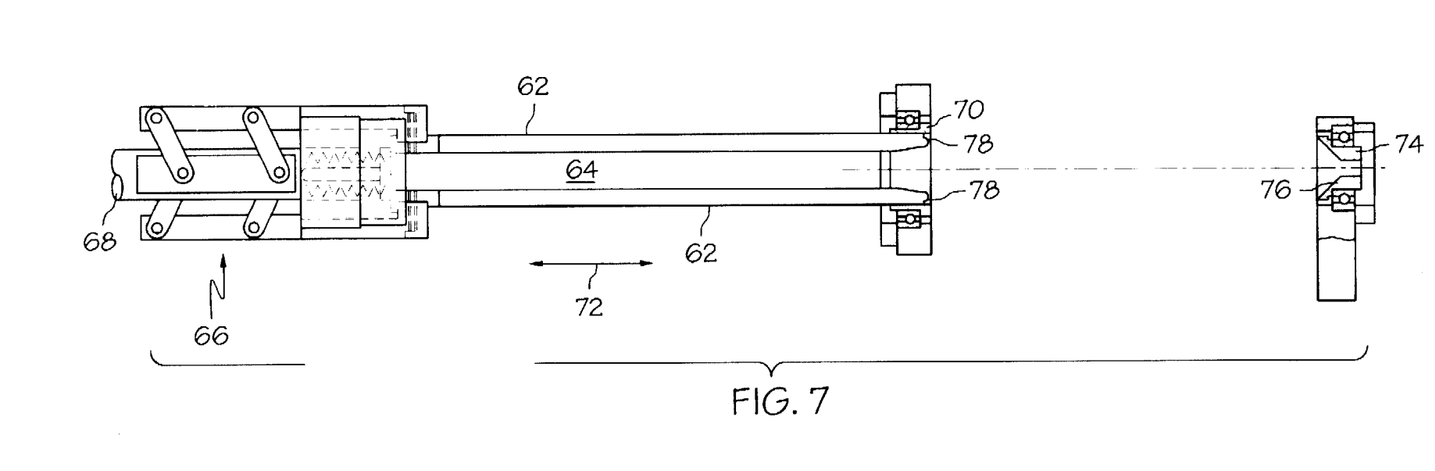
FIG. 7 is an illustration of the rolling blade assembly of FIG. 6 in a non-engaged position.

Finally, the cushion receiving mechanism 20 also includes a pair of rollup blades 62 defining a cushion portion receiving space 64 therebetween. As is illustrated in FIGS. 6 and 7, the pair of rollup blades 62 are coupled via spring loaded coupling hardware 66 to an axially movable member 68. The axially movable member 68 is coupled to the transverse actuator 58 so as to move back and forth in a direction transverse to the cushion path 22. A first bushing 70 is provided to guide movement of the rollup blades 62 as the axially movable member 68 moves back and forth in a direction transverse to the cushion path 22, as indicated by arrow 72, see FIG. 7. A second bushing 74 is positioned at an end point of the transverse path. The second bushing has a tapered blade contacting surface 76 which upon being contacted by tapered distal ends 78 of the pair of rollup blades 62 causes the rollup blades 62 to move toward one another so as to clamp the cushion end section 13 of the cushion portion 12 positioned in the receiving space 64. Thus, when the pair of rollup blades 62 are advanced in a direction transverse to the cushion path, they will engage therebetween the inflatable cushion portion 12. It is contemplated by the present invention that only one of the rolling blade contacting surface 76 of the second bushing 74 and the distal ends 78 of each of the pair of rollup blades 62 may include a tapered surface.

The controller 56 controls the position of the transverse actuator 58 and the pair of rollup blades 62 via the three position pneumatic drive described above. The first position is illustrated in FIG. 7, the third position is illustrated in FIG. 6, and the second position is a rolling blade home position at which the distal ends 78 of the blades 62 lie in a position slightly to the left of the second bushing 74 such that a majority of the rollup blades 62 lie in the cushion path 22 while the receiving space 64 is fully open.

The operation of the folding device 10 will be described with reference to FIGS. 1 and 2A–2D. Initially, an operator installs the cushion assembly by loading the cushion module 18 into the cushion fixture 16 and inserts the cushion end section 13 into the receiving space 64 between the pair of rollup blades 62 such that the inflatable cushion portion 12 extends along the cushion path 22 between the cushion fixture 16 and the cushion receiving mechanism 20. The operator then initiates an automated folding cycle by actuating one or two cycle start switches (not shown). The automated folding cycle is carried out by the controller 56 programmed to perform the below described sequential machine logic steps. The controller 56 is the combination of an A-Series Mitsubishi programmable logic controller used with a Mitsubishi GOT series operator interface and an Emerson Axima Motion controller and is programmed such that each of the operational steps must be completed prior to the next step or motion taking place. The folding device 10 includes sensors to detect when each operational step has been completed. Although a variety of sensors can be utilized with the present device, specific examples of appropriate sensors are described below. It is contemplated by the present invention that a variety of commercially available controllers may be utilized without departing from the scope of the present invention.

After installation of the cushion assembly, the left and right heat shield flaps of the cushion portion 12 are secured to the bag support members 49. Next, the cushion fixture 16 engages, or clamps, the cushion module 18 of the cushion assembly 14 and the cushion receiving mechanism 20 engages or clamps the end section 13 of the inflatable cushion portion 12. Specifically, the cushion end section 13, having been inserted into the receiving space 64 between the pair of rollup blades 62, is clamped by the pair of rollup blades 62 in the manner described above with reference to FIGS. 6 and 7.

Next, the cushion fixture 16 is rotated from a vertical to a horizontal position, i.e., the open end of the cushion module 18 is oriented so as to face the fold location 26. The fixture servo assembly 28 is then moved from its home position, proximate the fold location 26, to its rear position, proximate the controller 56. With the fixture servo assembly 28 in the rear position, the inflatable cushion portion 12 is inflated. The left side stuff blade 34 and the right side stuff blade 38 are advanced in the direction of the cushion path 22. Each side stuff blade advances slightly past the center line of the cushion portion 12 so as to force sides of the inflated cushion portion 12 towards the center of the cushion portion 12. The cushion portion 12 is then evacuated and the vacuum is maintained until the cushion portion 12 is vented after folds have been created in the cushion portion as described below. Subsequently, the left side stuff blade 34 and the right side stuff blade 38 are retracted to their original positions. At this point the cushion portion 12 is in a substantially rectangular shape of substantially uniform thickness and extends from the cushion fixture 16 to the cushion receiving mechanism 20 along the cushion path 22. Next, the front and rear support tables 41, 43 are raised.

With the front and rear support tables raised, the drive assembly 39 of the left side fold assembly 40 advances the left side folding flap 42 and the left heat shield flap (not shown) from an unfolded position to a folded position and, subsequently, the drive assembly 37 of the right side fold assembly 44 advances the right side folding flap 46 and the right heat shield flap (not shown) from an unfolded position to a folded position, so as to effect folding of the heat shield flaps about the cushion portion 12.

After the heat shield flaps are folded about the cushion portion 12, the controller 56 causes the fold retainer arm 48 to advance from the fold retainer arm home position to the heat shield engaging position to hold the heat shield flaps in place. With the fold retainer arm 48 in the heat shield engaging position, the controller 56 causes the left side folding flap 42 and the right side folding flap 46 to advance from their folded positions to their unfolded positions. Notches 42a and 46a, provided in the flaps 42 and 46, allow the flaps 42, 46 to move to their unfolded positions without contacting the fold retainer arm 48. Subsequently, the rear support table 41 is lowered.

Next, a 145 degree turn at the rollup blades 62 is effected in a first direction, which direction is indicated by arrow 63 in FIG. 2A, by the servo rotary drive 60 to tension the cushion portion 12. With the cushion portion 12 in tension, the controller 56 concurrently commands the fixture servo assembly 28 and the cushion receiving mechanism servo rotary drive 60 such that the cushion fixture 16 is advanced toward the cushion receiving mechanism 20 until the pair of rollup blades 62 has rotated an additional 665 degrees in the first direction. This operation yields a three turn rollup of the cushion portion 12 about the rollup blades 62. Tension in the cushion portion 12 is next released as the controller 56 causes the cushion receiving mechanism 20 to disengage the inflatable cushion portion 12 and the cushion receiving mechanism rotary drive 60 to rotate the pair of rollup blades 62 180 degrees in a second direction opposite the first direction.

With tension released from the cushion portion 12, the controller causes the upper folding blade unit shuttle 25 to move the upper folding blade unit 24a to the extended position proximate the folding area 26. Next, the fold stripper 23 is moved to the cushion portion engaging position 23b as illustrated in FIG. 5.

With the fold stripper 23 in the cushion portion engaging position 23b, the controller 56 commands the fixture servo assembly 28 to move the cushion fixture 16 incrementally towards the fold developer 24 as it actuates the fold developer 24 to form folds in the cushion portion 12. Because the fixture servo assembly 28 moves the cushion fixture 16 incrementally towards the fold developer 24 as folds are formed, tension and wear during the folding process are minimized and only a minimal amount of force need be applied to the cushion portion 12 to create folds in the cushion portion 12. In other words, the controller 56 is programmed to control the operation of the fold developer 24 and the servo motor of the fixture servo assembly 28 so as to permit the cushion portion to be folded without unacceptable stretch occurring at the cushion portion. The creation of the folds is described in detail below with reference to FIGS. 2A–2D.

After the folds have been created, the controller 56 causes the fixture rotation assembly 30 to rotate the cushion fixture 16 to the vertical position, activates the cushion receiving mechanism transverse actuator 58 such that the cushion receiving mechanism 20 is removed from the cushion path 22, and causes the cushion portion 12 to be vented, i.e., the cushion portion is no longer evacuated.

Next, the controller 56 causes the cushion fixture 16 to release the cushion module 14 and the fold compressor 54 to advance in the direction of the cushion path 22 so as to compress the folded cushion portion 12. The fold stripper 23 is raised, the fixture servo assembly 28 is returned to the front of the machine, the cushion receiving mechanism rotary drive 60 is actuated to align the receiving space 64 horizontally in the cushion path 22, the upper folding blade unit 24a is moved to the retracted position 27, the fold compressor 54 is retracted away from the cushion path 22, and the rollup blades 62 are moved to the rollup blade home position described above with reference to FIGS. 6 and 7. The operator then manually finishes the folding process by gathering the cushion portion 12 and inserting it into the cushion module 14 while preserving the folds. The cushion module 14 and the fully contained cushion portion 12 are then removed from the folding device 10 and are ready for installation.

FIGS. 2A–2D illustrates the alternating sequence of movements which yields the folds in the cushion portion 12. The upper folding blade unit 24a, and the lower folding blade unit 24b include a plurality of upper folding blades 1a–4a and a plurality of lower folding blades 1b–4b. To create a folded cushion portion, with the fold stripper 23 in the cushion portion engaging position 23b, as described above, the fixture servo assembly 28 is advanced a distance corresponding to the size of an individual fold to a first incremental position and the first lower folding blade 1b is extended as shown in FIG. 2A. Next, the fixture servo assembly 28 is advanced a distance corresponding to the size of an individual fold to a second incremental position and the first upper folding blade 1a is extended as shown in FIG. 2A. Next, the fixture servo assembly 28 is advanced a distance corresponding to the size of an individual fold to a third incremental position and the second lower folding blade 2b is extended as shown in FIG. 2A. At this point, the fold retainer arm 48 is removed from the heat shield engaging position and the front support table 43 is lowered. Next, the fixture servo assembly 28 is advances incrementally to successive incremental positions and successive upper and lower folding blades are advanced in the following sequence as illustrated in FIGS. 2B–2D: 2a, 3b, 3a, 4b, 4a. In a preferred embodiment, where the fold size x is about 1.375 inches, see FIG. 2C, the fixture is incrementally advanced twice the fold size or about 2.75 inches. Finally, all of the upper and lower folding blades are retracted, except for the fourth lower folding blade 4b, in the following sequence: 4a; 3a and 3b concurrently; 2a and 2b concurrently; and 1a and 1b concurrently. The fourth lower folding blade 4b remains advanced to provide a surface against which the fold compressor 54 urges the cushion portion 12, as described above.

In the illustrated embodiment, each of the upper and lower folding blades 1a–4a, 1b–4b, advance to create a fold in the inflatable cushion portion 12 by moving a distal end 86 of each folding blade along non-linear parallel predetermined distal end paths. For the purpose of illustrating one of the end paths of an upper blade, the distal end path of the fourth upper folding blade 4a is illustrated in FIGS. 2B–2D. For the purpose of illustrating one of the distal end paths of a lower blade, the distal end path 90 of the fourth lower folding blade 4b is illustrated in FIG. 5. Each distal end path includes a cushion approaching component of movement 80, a gathering component of movement 82 parallel to the cushion path 22 and directed towards the cushion receiving mechanism 20, and a cushion fixture approaching component of movement 84 parallel to the cushion path 22 and directed towards the cushion fixture 16, see FIGS. 2C and 2D. As is illustrated in FIG. 5, each distal end path extends towards the cushion fixture 16 prior to extending towards the cushion receiving mechanism 20. Further, each distal end path extends vertically towards the cushion portion while extending towards the cushion receiving mechanism 20 and the cushion fixture 16. Thus, the orientation of the folding blade axis changes from a first position perpendicular to the cushion path 22, see FIG. 2B, to a second position not perpendicular to the cushion path 22, i.e. at an angle $\theta$ from vertical, see FIG. 2C, to a third position perpendicular to the cushion path 22, see FIG. 2D. The angle $\theta$ is preferably about $10°–15°$, however, it is contemplated that a variety of values for $\theta$ can be utilized without departing from the scope of the present invention. The gathering component of movement 82 serves to reduce the amount of force necessary to apply to the cushion portion 12 in creating the folds with the folding blades 1a–4a, 1b–4b. It is contemplated that a variety of linear and non-linear cushion paths may be selected to incorporate the gathering component of movement 82 without departing from the scope of the present invention.

Figure 3:
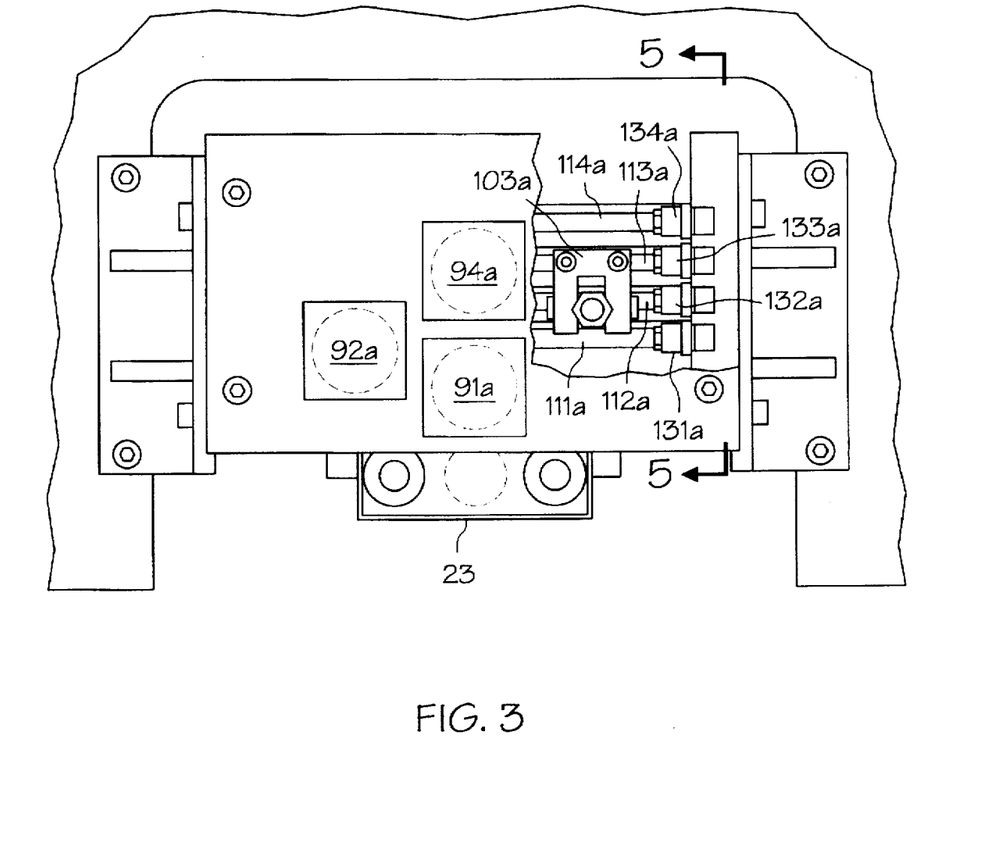
FIG. 3 is a top view of a fold developing unit according to the present invention with the remainder of the folding device broken away.
Figure 4:
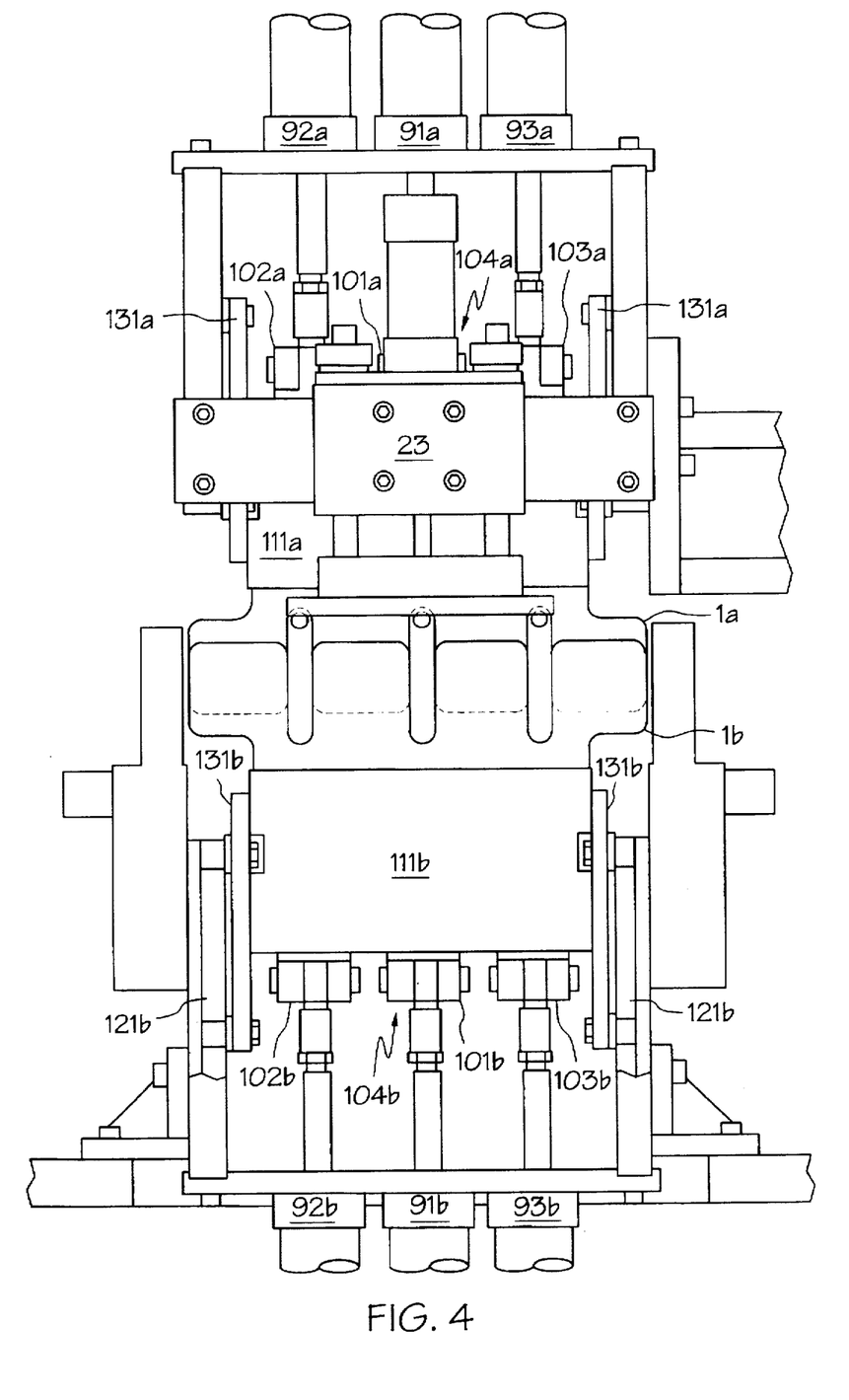
FIG. 4 is a front view of the fold developing unit illustrated in FIG. 3 with portions of pneumatic drive cylinders broken away.

FIGS. 3–5 illustrate the fold developer 24 in detail, including the structure responsible for causing the distal ends 86 of the folding blades 1a–4a, 1b–4b to follow the predetermined distal end paths described above. Each folding blade 1a–4a, 1b–4b is coupled to a reciprocally actuable vertically oriented pneumatic drive cylinder 91a–94a, 91b–94b. Each drive cylinder 91a–94a, 91b–94b is in turn coupled to a corresponding folding blade 1a–4a, 1b–4b via a hinged rod clevis assembly 101a–104a, 101b–104b, and a folding blade base plate 111a–114a, 111b–114b. The hinged rod clevis assemblies 101a–104a are not shown in FIG. 5. Each folding blade base plate 111a–114a, 111b–114b is mounted to move along, or slide through, a corresponding pair of opposing blade tracks 121a–124a, 121b–124b. Each blade track 121a–124a, 121b–124b is in the form of a groove or channel forming opposing roller receiving camming surfaces in the walls of the fold developer 24. A base plate roller assembly 131a–134a, 131b–134b, including track engaging rollers 141a–144a, 141b–144b, facilitates free movement of each folding blade base plate 111a–114a, 111b–114b along the corresponding pair of blade tracks 121a–124a, 121b–124b. The curved portions of each pair of blade tracks 121a–124a, 121b–124b are designed to allow the distal end 86 of each folding blade 1a–4a, 1b–4b to move along its predetermined distal end path 90 as the distal end 86 comes into contact with the cushion portion 12 upon actuation of the drive cylinder 91a–94a, 91b–94b.

The movement of the fixture servo assembly 28 is monitored by an associated encoder 31 which generates signals which are received by the controller 56. Additionally, a front overtravel switch 29a and a rear overtravel switch 29b, in cooperation with a switch actuator 27 which moves with the fixture servo assembly 28, are arranged to provide a signal to the controller 56 if the fixture servo assembly 28 travels beyond the front and rear overtravel limits. The front and rear overtravel limits are set to prevent collision of the fixture servo assembly with the mechanical limits of the folding device 10. A fixture servo assembly home position switch 29c is also provided to cooperate with the switch actuator 27 and provide a fixture servo assembly home position signal to the controller 56. The home position of the fixture servo assembly is set by the controller 56 at a fixed distance from the home position switch 29. Similarly, the rotary position of the cushion receiving mechanism servo rotary drive 60, and consequently the pair of rolling blades 62, is monitored by an encoder (not shown) in communication with the controller 56.

Two magnetic reed switches (not shown) are provided in the cushion fixture 16 and send respective signals to the controller 56 when the cushion fixture is in the horizontal and vertical positions. Two proximity switches (not shown) are provided to monitor the orientation of the fold retainer arm 48 and to send respective signals to the controller 56 when the fold retainer arm 48 lies in the heat shield engaging position and the fold retainer arm home position. The remaining movable members of the folding device, i.e., the upper fold blade shuttle 25, the stuff blades 34 and 38, the folding flaps 42 and 46, the rear support table 41, the fold compressor 54, the folding blades 1a–4a, 1b–4b, and the transverse actuator 58, are coupled to pneumatic drives which are assembled with reed switches that send signals to the controller 56 indicating the position of the member associated with the specific drive and sensor. For example, the front support plate 43 is driven by a pneumatic slide (not shown) from a lowered position to a raised position. Reed switches are provided with the pneumatic drive, in manner well known by those of ordinary skill in the art, to provide signals when the pneumatic drive, and consequently when the front support plate, reaches the lower and raised positions.

A bar code scanner (not shown) is preferably provided in communication with the controller 56 so as to enable reading of a bar coded serial number present on the cushion module 14 prior to folding. As a safety measure, optical sources and detectors forming an effective light curtain are preferably provided in communication with the controller 56 so as to send a stop signal to the controller when an operator or foreign object enters the vicinity of the moving parts of the folding device 10. As a further safety measure, to start or restart operation of the folding device 10, two spaced apart cycle start switches (not shown) are provided in communication with the controller 56. Both cycle start switches must be activated within 0.3 second of each other to start or restart operation of the folding device 10. Further, the spacing of the cycle start switches is such that each must be actuated by separate hands of an operator.

It is contemplated by the present invention that, although the above-described operational steps are preferably effected sequentially, some of the steps may be performed contemporaneously without departing from the scope of the invention.

Having described the invention in detail and by reference to preferred embodiments thereof, it will be apparent that modifications and variations are possible without departing from the scope of the invention defined in the appended claims.

What is claimed is:

1. An inflatable cushion folding device comprising:

a cushion fixture adapted to releasably engage a cushion module of a cushion assembly;

a cushion receiving mechanism spaced from said cushion fixture and adapted to releasably engage an inflatable cushion portion of said cushion assembly such that said inflatable cushion portion is positioned along a cushion path extending between said cushion fixture and said cushion receiving mechanism; and a fold developer positioned in a folding area located along said cushion path for creating at least one fold in said inflatable cushion portion, said fold developer including at least one folding blade slidably coupled to a blade track wherein said blade track defines a track path designed to permit movement of a distal end of said at least one folding blade along a distal end path including (i) a cushion approaching component of movement and (ii) a gathering component of movement parallel to said cushion path and directed towards said cushion receiving mechanism, and wherein said blade track is designed to permit the orientation of an axis of said at least one folding blade to change from a first position perpendicular to said cushion path to a second position not perpendicular to said cushion path to a third position perpendicular to said cushion path.

2. A device as claimed in claim 1 wherein said distal end path includes a cushion fixture approaching component of movement parallel to said cushion path and directed towards said cushion fixture.

3. A device as claimed in claim 1 wherein said fold developer comprises an upper folding blade slidably coupled to an upper blade track and a lower folding blade slidably coupled to a lower blade track wherein said upper blade track defines an upper track path designed to move a distal end of said upper folding blade along an upper blade distal end path including (i) a cushion approaching component of movement and (ii) a gathering component of movement parallel to said cushion path and directed towards said cushion receiving mechanism and said lower blade track defines a lower track path designed to move a distal end of said lower folding blade along a lower blade distal end path including (i) a cushion approaching component of movement and (ii) a gathering component of movement parallel to said cushion path and directed towards said cushion receiving mechanism.

4. A method of folding an inflatable cushion portion of a cushion assembly comprising the steps of:

installing said cushion assembly in a cushion fixture and a cushion receiving mechanism such that said inflatable cushion portion of said cushion assembly is positioned along a cushion path extending between said cushion fixture and said cushion receiving mechanism; and creating at least one fold in said inflatable cushion portion at a fold location along said cushion path by moving a distal end of a folding blade along a distal end path, said distal end path including (i) a cushion approaching component of movements, (ii) a gathering component of movement parallel to said cushion path and directed towards said cushion receiving mechanism, and (iii) a cushion fixture approaching component of movement parallel to said cushion path and directed towards said cushion fixture, wherein said distal end path extends towards said cushion fixture prior to extending towards said cushion receiving mechanism.

5. A folding device for folding an inflatable cushion portion of a cushion assembly comprising:

a cushion fixture adapted to releasably engage a cushion module of a cushion assembly;

a cushion receiving mechanism spaced from said cushion fixture and adapted to releasably engage an inflatable cushion portion of said cushion assembly such that said cushion portion is positioned along a cushion path extending between said cushion fixture and said cushion receiving mechanism, wherein said cushion receiving mechanism comprises a pair of rollup blades defining a cushion portion receiving space therebetween, a cushion receiving mechanism transverse actuator operative to advance said pair of rollup blades along a path transverse to said cushion path, and a bushing positioned at an end point of said transverse path and having a blade contacting surface which upon being contacted by distal ends of said pair of rollup blades causes said rollup blades to move toward one another to clamp said cushion portion therebetween, wherein at least one of the blade contacting surface of said bushing and the distal ends of each of said pair of rollup blades include a tapered surface;

a fold developer positioned in a folding area located along said cushion path for creating at least one fold in said inflatable cushion portion;

a fixture servo assembly coupled to said cushion fixture for effecting incremental movement of said cushion fixture towards said fold developer; and a fold controller operative to actuate said fold developer and operative to command said fixture servo assembly to move said cushion fixture incrementally towards said fold developer.

6. A folding device as claimed in claim 5 wherein said fold controller is further operative to cause said cushion receiving mechanism to disengage said inflatable cushion prior to actuation of said fold developer.

7. A folding device as claimed in claim 5 wherein said fold controller is operative to actuate said fold developer subsequent to an initial incremental movement of said cushion fixture.

8. A folding device as claimed in claim 5 wherein said fold developer includes a plurality of fold blades, wherein said fold controller is operative to actuate a first fold blade subsequent to a first incremental movement of said cushion fixture and actuate a successive fold blade following a subsequent second incremental movement of said cushion fixture.

9. A folding device as claimed in claim 5 wherein said fold controller is operative to actuate said fold developer and command said fixture servo assembly in an alternating sequence.

10. A folding device as claimed in claim 5 wherein said cushion receiving mechanism comprises:

a cushion receiving mechanism transverse actuator; and a cushion receiving mechanism rotary drive.

11. An inflatable cushion folding device comprising:

a cushion fixture adapted to releasably engage a cushion module of a cushion assembly;

a cushion receiving mechanism spaced from said cushion fixture and adapted to releasably engage an inflatable cushion portion of said cushion assembly such that said inflatable cushion portion is positioned along a cushion path extending between said cushion fixture and said cushion receiving mechanism;

a fold developer positioned in a folding area located along said cushion path for creating at least one fold in said inflatable cushion portion, said fold developer including at least one folding blade slidably coupled to a blade track wherein said blade track defines a track path designed to permit movement of a distal end of said at least one folding blade along a distal end path including (i) a cushion approaching component of movement and (ii) a gathering component of movement parallel to said cushion path and directed towards said cushion receiving mechanism wherein said fold developer further comprises a plurality of additional folding blades slidably coupled to respective blade tracks wherein each of said respective blade tracks defines respective track paths designed to permit movement of a distal end of one of said plurality of folding blades towards said cushion path along respective distal end paths substantially parallel to said distal end path.

12. A method of folding an inflatable cushion portion of a cushion assembly comprising the steps of:

installing a cushion assembly in a cushion fixture and a cushion receiving mechanism such that said inflatable cushion portion of said cushion assembly is positioned along a cushion path extending between said cushion fixture and said cushion receiving mechanism; and creating at least one fold in said inflatable cushion portion at a fold location along said cushion path by moving a distal end of a folding blade along a distal end path, said distal end path including (i) a cushion approaching component of movement and (ii) a gathering component of movement parallel to said cushion path and directed towards said cushion receiving mechanism, and changing the orientation of an axis of said folding blade from a first position perpendicular to said cushion path to a second position not perpendicular to said cushion path to a third position perpendicular to said cushion path.

13. A method of folding an inflatable cushion portion of a cushion assembly comprising the steps of:

installing a cushion assembly in a cushion fixture and a cushion receiving mechanism such that said inflatable cushion portion of said cushion assembly is positioned along a cushion path extending between said cushion fixture and said cushion receiving mechanism; and creating at least one fold in said inflatable cushion portion at a fold location along said cushion path by moving a distal end of a folding blade along a distal end path, said distal end path including (i) a cushion approaching component of movement and (ii) a gathering component of movement parallel to said cushion path and directed towards said cushion receiving mechanism, and moving a distal end of successive ones of a plurality of folding blades towards said cushion path along respective distal end paths substantially parallel to said distal end path.

14. A method of folding an inflatable cushion portion of a cushion assembly comprising the steps of:

installing a cushion assembly in a cushion fixture and a cushion receiving mechanism such that said inflatable cushion portion of said cushion assembly is positioned along a cushion path extending between said cushion fixture and said cushion receiving mechanism;

creating at least one fold in said inflatable cushion portion at a fold location along said cushion path by moving a distal end of a lower folding blade along a lower blade distal end path including (i) a cushion approaching component of movement and (ii) a gathering component of movement parallel to said cushion path and directed towards said cushion receiving mechanism and subsequently moving a distal end of an upper folding blade towards said cushion path along an upper blade distal end path including (i) a cushion approaching component of movement and (ii) a gathering component of movement parallel to said cushion path and directed towards said cushion receiving mechanism; and creating a plurality of additional folds in said inflatable cushion portion at said fold location by moving successive upper folding blades along successive upper blade distal end paths parallel to said upper blade distal end path and successive lower folding blades along successive lower blade distal end paths parallel to said lower blade distal end path.

15. A folding device for folding an inflatable cushion portion of a cushion assembly comprising:

a cushion fixture operative to releasably engage a cushion module of a cushion assembly;

a cushion receiving mechanism spaced from said cushion fixture and operative to releasably engage an inflatable cushion portion of said cushion assembly such that said cushion portion is positioned along a cushion path extending between said cushion fixture and said cushion receiving mechanism;

a fold developer positioned in a folding area located along said cushion path and operative to create at least one fold in said inflatable cushion portion;

a fixture servo assembly coupled to said cushion fixture operative to effect incremental movement of said cushion fixture towards said fold developer;

a fixture rotation assembly coupled to said cushion fixture operative to effect rotary movement of said cushion fixture about a rotary fixture axis perpendicular to said cushion path;

a left side stuff blade assembly positioned adjacent said cushion path and operative to reciprocally advance a left side stuff blade in the direction of said cushion path;

a right side stuff blade assembly positioned adjacent said cushion path and operative to reciprocally advance a right side stuff blade in the direction of said cushion path;

a left side fold assembly positioned proximate said cushion path and operative to reciprocally advance a left side folding flap from an unfolded position to a folded position;

a right side fold assembly positioned proximate said cushion path and operative to reciprocally advance a right side folding flap from an unfolded position to a folded position;

a fold retainer assembly positioned proximate said cushion path and operative to reciprocally advance a fold retainer arm from a fold retainer arm home position to a heat shield engaging position;

a fold compressor positioned adjacent said cushion receiving mechanism and operative to reciprocally advance in a direction parallel to said cushion path so as to compress said at least one fold; and a fold controller for controlling the operation of said cushion fixture, said cushion receiving mechanism, said fold developer, said fixture servo assembly, said fixture rotation assembly, said left side stuff blade, said right side stuff blade, said left side fold assembly, said right side fold assembly, said fold retainer assembly, and said fold compressor.

16. A folding device as claimed in claim 15, wherein said fold controller is operative to:

cause said cushion fixture to engage said cushion module;

cause said cushion receiving mechanism to engage said inflatable cushion portion;

cause said fixture rotation assembly to rotate said cushion fixture to a horizontal position;

effect inflation of said cushion portion;

cause said left side stuff blade assembly and said right side stuff blade assembly to advance said left side stuff blade and said right side stuff blade in the direction of said cushion path;

effect evacuation of said cushion portion;

cause said left side stuff blade assembly and said right side stuff blade assembly to retract said left side stuff blade and said right side stuff blade;

cause said left side fold assembly to advance said left side folding flap from said unfolded position to said folded position;

cause said right side fold assembly to advance said right side folding flap from said unfolded position to said folded position;

cause said fold retainer assembly to advance said fold retainer arm from said fold retainer arm home position to said heat shield engaging position;

cause said left side fold assembly to advance said left side folding flap from said folded position to said unfolded position;

cause said right side fold assembly to advance said right side folding flap from said folded position to said unfolded position;

create tension in said cushion portion by causing a cushion receiving mechanism rotary drive to rotate a pair of rollup blades 145 degrees in a first direction;

command said fixture servo assembly and said cushion receiving mechanism rotary drive such that said cushion fixture is advanced toward the cushion receiving mechanism until said pair of rollup blades has rotated 665 degrees in said first direction;

cause said cushion receiving mechanism to disengage said inflatable cushion portion and cause said cushion receiving mechanism rotary drive to rotate said pair of rollup blades 180 degrees in a second direction opposite said first direction;

actuate said fold developer and command said fixture servo assembly to move said cushion fixture incrementally towards said fold developer;

cause said fixture rotation assembly to rotate said cushion fixture to a vertical position;

activate a cushion receiving mechanism transverse actuator such that said cushion receiving mechanism is removed from said cushion path;

cause said fold compressor to advance in the direction of said cushion path so as to compress said at least one fold; and cause said cushion fixture to release said cushion module.

* * * * *